United States Patent
Yamamoto

(10) Patent No.: US 7,653,887 B2
(45) Date of Patent: Jan. 26, 2010

(54) METHOD AND APPARATUS FOR CALCULATING POWER CONSUMPTION, AND COMPUTER PRODUCT

(75) Inventor: Tatsuya Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 11/497,631

(22) Filed: Aug. 2, 2006

(65) Prior Publication Data
US 2007/0234248 A1    Oct. 4, 2007

(30) Foreign Application Priority Data
Mar. 30, 2006   (JP) .............................. 2006-093821

(51) Int. Cl.
G06F 9/45   (2006.01)
G06F 17/50   (2006.01)
(52) U.S. Cl. .............................................. 716/4; 716/6
(58) Field of Classification Search .................... 716/4, 716/6
See application file for complete search history.

(56) References Cited

U.S. PATENT DOCUMENTS

2004/0243376 A1*   12/2004   Karunaratne ................. 703/18
2005/0149799 A1*   7/2005   Hemia et al. ................. 714/726
2008/0092092 A1*   4/2008   Dalton et al. ................. 716/4

FOREIGN PATENT DOCUMENTS

JP   2001-265847   9/2001

OTHER PUBLICATIONS

Tehranipoor et al.; "Low Transition LFSR for BIST-Based Applications"; Mar. 23, 2005; IEEE; All pages.*
Girad et al.; "A Modified Clock Scheme for a Low Power BIST Test Pattern Generator"; 2001; IEEE; All pages.*
Wang et al.; "Maximum Power Estimation for Sequential Circuits Using a Test Generation Based Technique"; 1996; IEEE; Electrical and Computer Engineering, Purdue University; pp. 229-232.*

* cited by examiner

*Primary Examiner*—Jack Chiang
*Assistant Examiner*—Suresh Memula
(74) *Attorney, Agent, or Firm*—Fujitsu Patent Center

(57) ABSTRACT

A power consumption calculating apparatus includes a receiving unit, a specifying unit, a determining unit, an average calculating unit, an estimating unit, and a power consumption calculating unit. The receiving unit receives data of a target circuit. The specifying unit specifies a sequential circuit in the circuit. The determining unit, by developing a sequential circuit to a combinational circuit, determines a clock cycle to be input into the combinational circuit. The average calculating unit calculates the average number of transition after the number of transition of $2^N$-clock cycle is calculated. The estimating unit estimates the estimated number of transition. And the power consumption calculating unit calculates the maximum power consumption.

9 Claims, 5 Drawing Sheets

METHOD AND APPARATUS FOR CALCULATING POWER CONSUMPTION, AND COMPUTER PRODUCT

CROSS-REFERENCE TO RELATED APPLICATIONS

This application is based upon and claims the benefit of priority from the prior Japanese Patent Application No. 2006-093821, filed on Mar. 30, 2006, the entire contents of which are incorporated herein by reference.

BACKGROUND OF THE INVENTION

1. Field of the Invention

The present invention relates to a technology for calculating power consumption of a circuit.

2. Description of the Related Art

Recently, semiconductor integrated circuits (IC) are becoming to have high-density, large-scale, and high processing speed. Along with such progress, power consumption of the semiconductor IC has increased. To decrease the power consumption, it is necessary to precisely calculate power consumption of a semiconductor IC to design the semiconductor IC.

A method of calculating power consumption of a semiconductor IC has been proposed in, for example, Japanese Patent Laid-open Publication No. 2001-265847. According to the method, a power consumption calculating apparatus, by simulating a semiconductor IC, searches a node and an output terminal in the semiconductor IC of which logic values are unknown. The apparatus uniquely defines a signal level for the node and the output terminal based on the real semiconductor IC. Thus, the apparatus estimates power consumption of the semiconductor IC. However, with a conventional power consumption calculating technique, it is difficult to precisely calculate the power consumption at the designing stage. For example, power consumption of a semiconductor IC depends on data input into the semiconductor IC. The conventional apparatus calculates the power consumption while the semiconductor IC performs various operations, and therefore, the calculated power consumption is overestimated. Therefore, burden on a designer and a design period increase.

According to the power consumption calculating apparatus disclosed in Japanese Patent Laid-open Publication No. 2001-265847, the apparatus can not precisely calculate power consumption because the apparatus uniquely defines a signal level for the node and the output terminal having unknown logic value. Therefore, burden on a designer and a design period increase.

SUMMARY OF THE INVENTION

It is an object of the present invention to solve at least the above problems in the conventional technologies.

A computer-readable recording medium according to one aspect of the present invention stores therein a computer program for calculating power consumption. The computer program makes a computer execute receiving data of a target circuit; specifying a sequential circuit in the circuit based on the data; determining a clock cycle of a test pattern to be input into a combinational circuit generated by developing the sequential circuit; estimating number of transition of a logic gate output that is output from a logic gate in the combinational circuit while the circuit is under processing, based on the clock cycle; and calculating power consumption of the circuit based on the number of transition.

A method according to another aspect of the present invention is of calculating power consumption. The method includes receiving data of a target circuit; specifying a sequential circuit in the circuit based on the data; determining a clock cycle of a test pattern to be input into a combinational circuit generated by developing the sequential circuit; estimating number of transition of a logic gate output that is output from a logic gate in the combinational circuit while the circuit is under processing, based on the clock cycle; and calculating power consumption of the circuit based on the number of transition.

An apparatus for calculating power consumption according to still another aspect of the present invention includes a receiving unit configured to receive data of a target circuit; a specifying unit configured to specify a sequential circuit in the circuit based on the data; a determining unit configured to determine a clock cycle of a test pattern to be input into a combinational circuit generated by developing the sequential circuit; an estimating unit configured to estimate number of transition of a logic gate output that is output from a logic gate in the combinational circuit while the circuit is under processing, based on the clock cycle; and a consumption calculating unit configured to calculate power consumption of the circuit based on the number of transition.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings.

Figure 1:
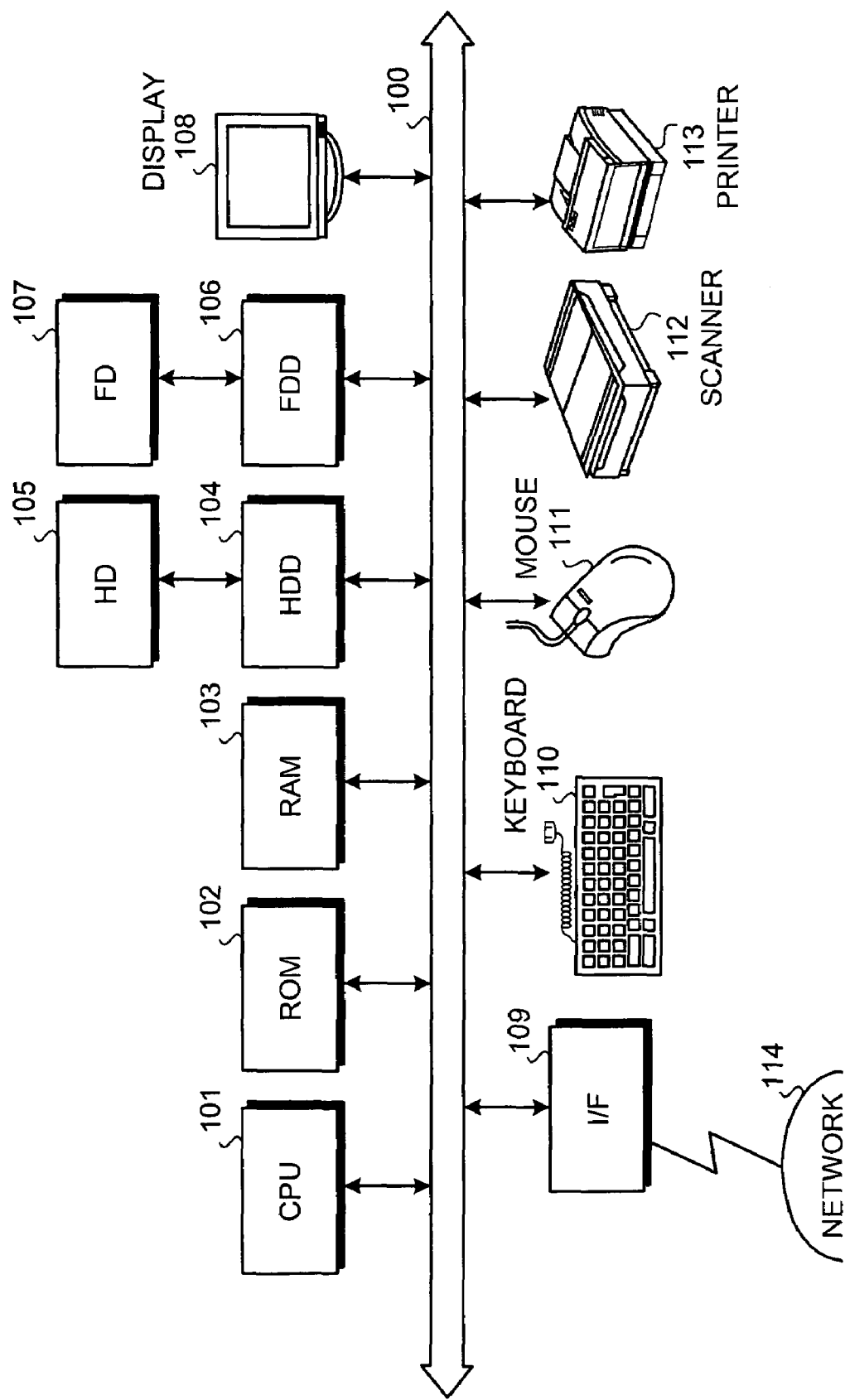
FIG. 1 is a schematic of a power consumption calculating apparatus according to embodiments of the present invention.

FIG. 1 is a schematic of a power consumption calculating apparatus according to embodiments of the present invention. The power consumption calculating apparatus includes a central processing unit (CPU) 101, a read only memory (ROM) 102, a random access memory (RAM) 103, a hard disk drive (HDD) 104, a hard disk (HD) 105, a flexible disk drive (FDD) 106, a flexible disk (FD) 107 as an example of a removable recording medium, a display 108, an interface (I/F) 109, a keyboard 110, a mouse 111, a scanner 112, and a printer 113. Each unit is connected through a bus 100.

The CPU 101 controls the entire power consumption calculating apparatus. The ROM 102 stores a program such as a boot program. The RAM 103 is used as a work area of the CPU 101. The HDD 104 controls reading and writing of data from and to the HD 105 in accordance with control of the CPU 101. The HD 105 stores data written in accordance with control of the HDD 104.

The FDD 106 controls reading and writing of data from and to the FD 107 in accordance with control of the CPU 101. The FD 107 stores data written in accordance with control of the FDD 106, and causes the power consumption calculating apparatus to read data written in the FD 107.

A compact-disc read-only memory (CD-ROM), a compact-disc recordable (CD-R), a compact-disc rewritable (CD-RW), a magneto optical (MO) disc, a digital versatile disc (DVD), and a memory card may be used as a removable recording medium besides the FD 107. The display 108 displays not only a cursor, an icon, and a tool box, but also data such as documents, images, function information, etc. For example, a cathode-ray tube (CRT), a thin-film transistor (TFT) display, a plasma display can be employed as the display 108.

The I/F 109 is connected to a network 114 such as the Internet via communication lines, and connected to other devices via the communication lines. The I/F 109 is an interface between the network 114 and the power consumption calculating apparatus, and controls input and output from and to external devices. For example, a modem and a local area network (LAN) adapter can be employed as the I/F 109.

The keyboard 110 includes plural keys to input characters, numbers, various instructions, etc. An input pad having a touch panel and a numeric key pad can be employed as the keyboard 110. The mouse 111 is for moving a cursor, selecting key range, moving a window, changing the size of a window, etc. A trackball and a joystick that have a similar function as a pointing device may be employed instead of the mouse 111.

The scanner 112 optically reads an image and captures image data into the power consumption calculating apparatus. The scanner may have a function of optical character recognition (OCR). The printer 113 prints out image data and document data. For example, a laser printer and an ink-jet printer can be employed as the printer 113.

Figure 2:
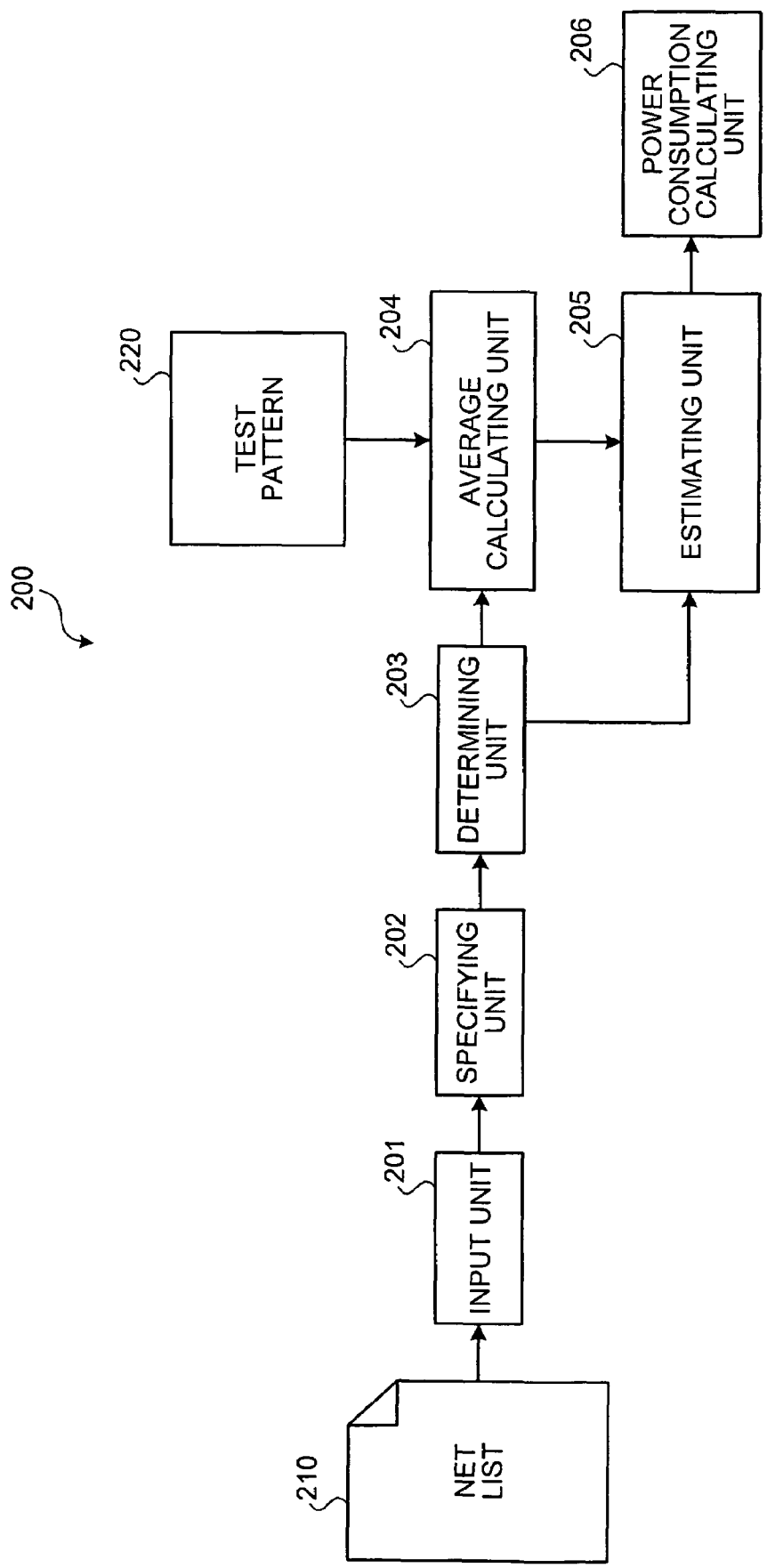
FIG. 2 is a block diagram of the power consumption calculating apparatus.

FIG. 2 is a block diagram of the power consumption calculating apparatus. A power consumption calculating apparatus 200 includes a receiving unit 201, a specifying unit 202, a determining unit 203, an average calculating unit 204, an estimating unit 205, and a power consumption calculating unit 206.

The receiving unit 201 receives data of a target circuit. The data indicates connection relation of circuit elements in the circuit. For example, a net-list 210 is obtained by performing logic synthesis on the hardware description language (HDL) at the register transfer level (RTL).

Figure 3:
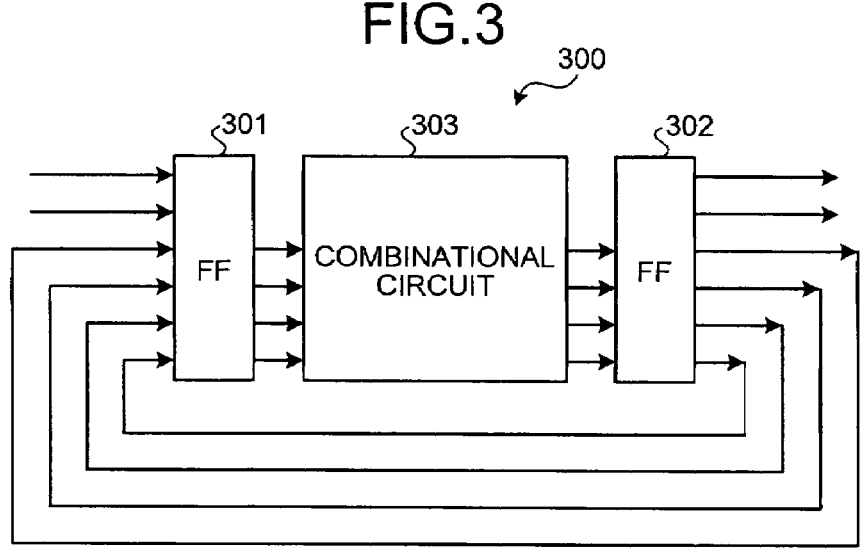
FIG. 3 is a schematic of a sequential circuit.

The specifying unit 202 specifies a sequential circuit in the circuit based on the data received by the receiving unit 201. When plural sequential circuits are included in the circuit, the specifying unit 202 respectively specifies the sequential circuits. FIG. 3 is a schematic of a sequential circuit. A sequential circuit 300 includes a flip-flop circuit (FF) 301, a FF 302, and a combinational circuit 303.

The determining unit 203, by developing the sequential circuit 300 specified by the specifying unit 202 to the combinational circuit 303, determines a clock cycle of a test pattern 220 to be input into the combinational circuit 303.

In other words, the determining unit 203 extracts the combinational circuit 303 in the sequential circuit 300, or the determining unit 203 generates a combinational circuit by combining plural combinational circuits selected. Hereinafter, a circuit generated by combining plural combinational circuits is referred to as an overlay circuit. A test pattern is data to be input when a test operation for the circuit is performed, and specifically is a test vector.

Figure 4:
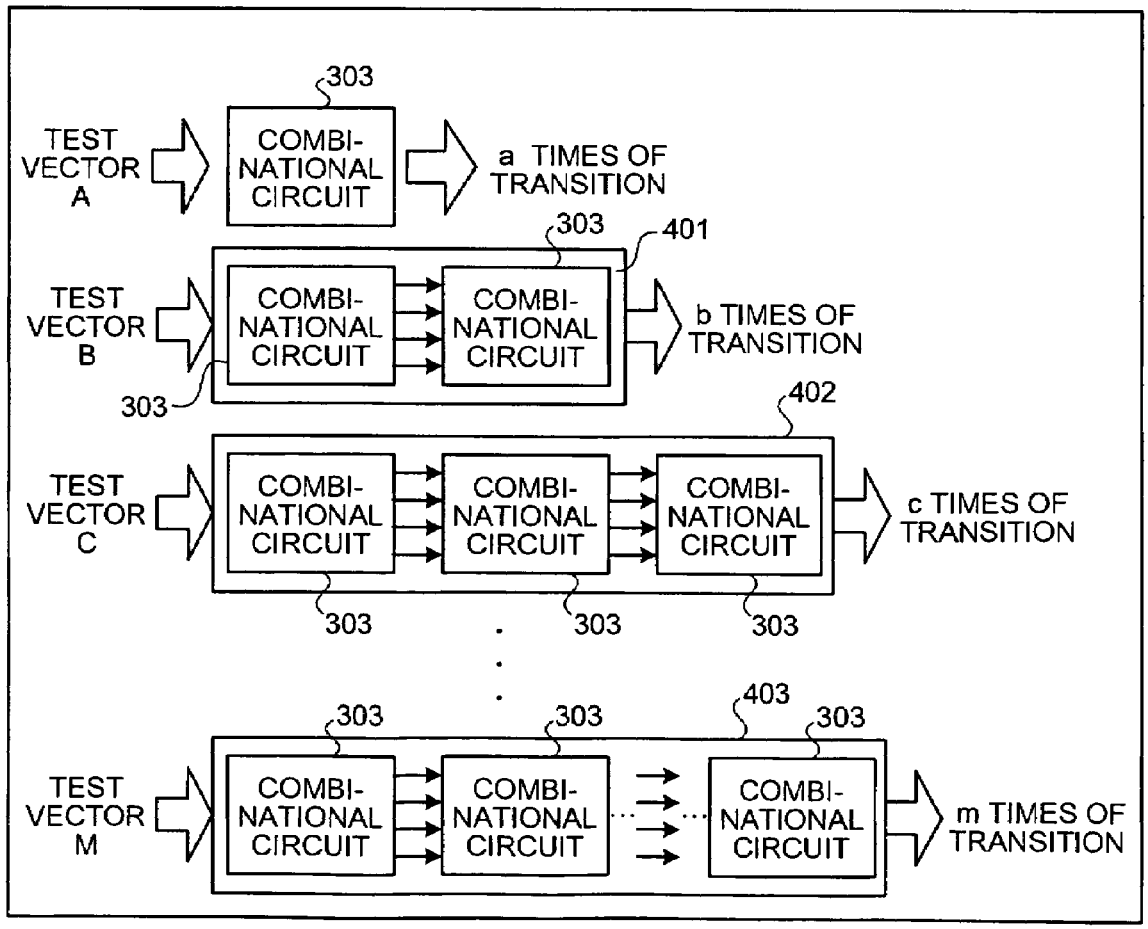
FIG. 4 is a schematic for illustrating a method of developing the sequential circuit.

FIG. 4 is a schematic for illustrating a method of developing a sequential circuit. An overlay circuit 401 is formed with two combinational circuits 303. An overlay circuit 402 is formed with three combinational circuits 303.

The determining unit 203 determines a clock cycle of a test vector by combining plural combinational circuits 303. For example, the determining unit 203 determines the clock cycle based on the number of combinational circuits forming an overlay circuit.

A test vector is generated by employing automatic test pattern generation (ATPG) for the developed combinational circuits 303. When ATPG is employed for one combinational circuit 303, a test vector of two-clock cycle ($2^1$) is generated. When ATPG is employed for m pieces of combinational circuits, the test pattern 220 of clock cycle of $2^m$ is generated.

The average calculating unit 204 calculates the average number of transition per a clock cycle, based on the test pattern 220. For example, the average calculating unit 204, by inputting a test vector into each of the combinational circuits 303 (overlay circuits 401 to 403), calculates the number of transition of logic gate output that is output from a logic gate in each of the combinational circuits 303 (the overlay circuits 401 to 403). Then, the average calculating unit 204 calculates the average number of transition by dividing the calculated number by a value of the clock cycle.

More specifically, for example, the average calculating unit 204 calculates the number of transition of two-clock cycle (X=1) at first. Suppose the calculated number of transition of two-clock cycle is a. Then the average number of transition (a/2) is calculated by dividing the calculated number (a) by the value (2) of the clock cycle.

Then, the average calculating unit 204 calculates the number of transition for four-clock cycle (X=2) in a similar manner. The calculated average number is {(a+b)/4}, where b is the calculated number of transition for four-clock cycle. The average calculating unit 204 repeats this processing for arbitrary X-clock cycle, and calculates the average number of transition for each clock cycle.

It is a known fact that the number of transition calculated after increasing a clock cycle is less than the number of transition calculated before increasing a clock cycle (for example, b<a). Therefore, the average number of transition is supposed to be decreased as a clock cycle is increased, and converges to a fixed value. Each of the calculated average number of transition has the following relation.

$$\frac{a}{2} > \frac{a+b}{2^2} > \ldots > \frac{(a+b+\ldots m)}{2^m} \quad (1)$$

Figure 5:
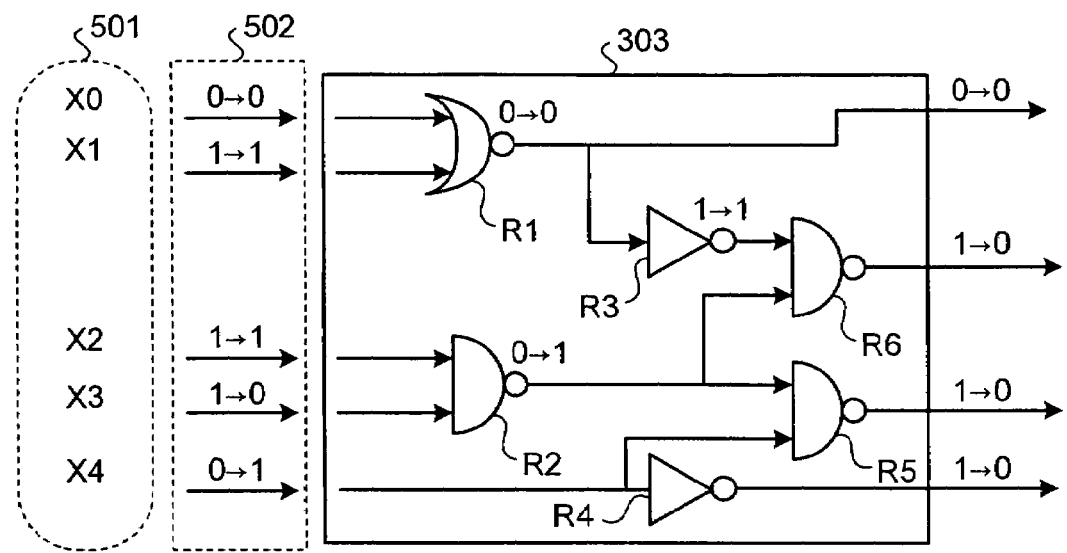
FIG. 5 is a schematic for illustrating a method of calculating the number of transition.

FIG. 5 is a schematic for illustrating a method of calculating the number of transition. The combinational circuit 303 includes logic elements R1 to R6.

A reference character 501 represents test vectors (X0 to X4) to be input into the logic elements R1 to R6. A reference character 502 represents data of the test vector to be input into the combinational circuit 303. Each test vector inputs test vector of two clocks into the combinational circuit 303 in every one clock. "0→0" in the reference character 502 indicates that data "0" is input in the first clock cycle, and data "0" is input in the second clock cycle.

The number of transition is obtained by calculating the number of data in which transition has occurred among data output to the logic gate of the logic elements R1 to R6. For example, the logic gate output of the logic element R2 makes transition of "0→1", and the logic gate outputs of the logic elements R4 to R6 make transition of "1→0". Therefore, the number of transition in the $2^1$-clock cycle is "4".

The estimating unit 205 calculates the estimated number of transition of the logic gate output in each of the combinational circuits 303 (the overlay circuits 401 to 403) during operation of the target circuit, based on a clock cycle determined by the determining unit 203. The estimated number of transition is an estimated upper limit of the number of transition during operation of the circuit.

As explained above, the average number of transition is supposed to decrease as a clock cycle increases to converge to a fixed value. The converged value is the estimated number of transition.

Figure 6:
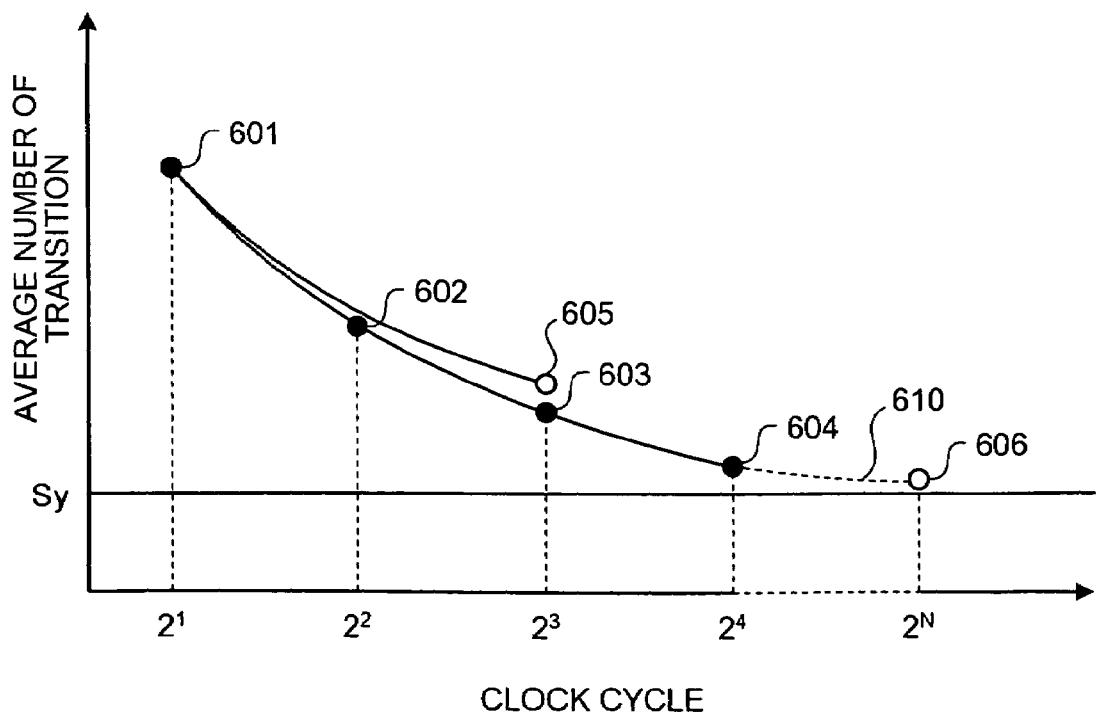
FIG. 6 is a schematic for illustrating a method of calculating the estimated number of transition of a gate output.

The estimating unit 205 calculates the estimated number of transition based on a larger clock cycle than the clock cycle (determined by the determining unit 203) and the average number of transition calculated by the average calculating unit 204. FIG. 6 is a schematic for illustrating a method of estimating the number of transition of a logic gate output. A vertical axis indicates the average number of transition, and a horizontal axis indicates a clock cycle.

Each of black dots (601 to 604) indicates the average number of transition of each clock cycle calculated by inputting a test vector. Each of white dots (605, 606) indicates the average number of transition of each clock cycle calculated from an approximated curve 610. For example, the white dot 605 indicates the average number of transition calculated from an approximated curve including the two black dots 601, 602. The white dot 606 indicates the average number of transition calculated from an approximated curve including the four black dots 601 to 604.

A function of an approximated curve is defined for plotted dots (black dots 601 to 604 in FIG. 6). Hereinafter, a function of following Equation 2 is taken as an example of the function.

$$y = \alpha \times 2^x + \beta \quad (2)$$

α and β is calculated using the method of least squares by assigning values of x and y indicated by the black dots 601 to 604 to Equation 2. Thus, a function of the approximated curve 610 can be obtained.

The average number of transition of the white dot 606 can be calculated by substituting the clock cycle $2^N$ for the obtained function of the approximated curve 610. The estimated number of transition (Sy) can be obtained from decreasing inclination of an approximated curve. For example, when the absolute value of the inclination of the approximated curve 610 of the clock cycle $2^N$ is less than a threshold, the average number of transition of the clock cycle $2^N$ can be defined as the estimated number of transition (Sy).

The threshold may be set in advance, or may be defined by a user referring to the decreasing inclination of the approximated curve. The estimated number (Sy) may be defined based on difference between the average number of transition of the clock cycle $2^N$ and the average number of transition of the clock cycle $2^{N-1}$.

The power consumption calculating unit 206 calculates power consumption of the target circuit based on the estimated number of transition (Sy). Power consumption W is calculated from following Equation 3, where L is the number of transition of data of the logic gate output that is output from each logic element in each of the combinational circuits 303 (the overlay circuits 401 to 403), w is power consumption for one transition of a signal, Q is power of leakage current occurred in the circuit.

$$W = L \times w + Q \quad (3)$$

The estimated number of transition is substituted for the number of transition L in Equation 3. Thus, power consumption that is approximately equal to power consumption of an actual IC can be calculated.

When plural sequential circuits 300 are specified by the specifying unit 202, power consumption of each sequential circuit 300 is calculated by applying the processing explained above to each sequential circuit 300. The total power consumption of the whole circuit can be calculated by adding the calculated power consumption of each of the sequential circuits 300.

The receiving unit 201, the specifying unit 202, the determining unit 203, the average calculating unit 204, the estimating unit 205, and the power consumption calculating unit 206 can be actualized by causing the CPU 101 to execute a program stored in a recording medium such as the ROM 102, the RAM 103, the HD 105, and the FD 107 shown in FIG. 1.

Figure 7:
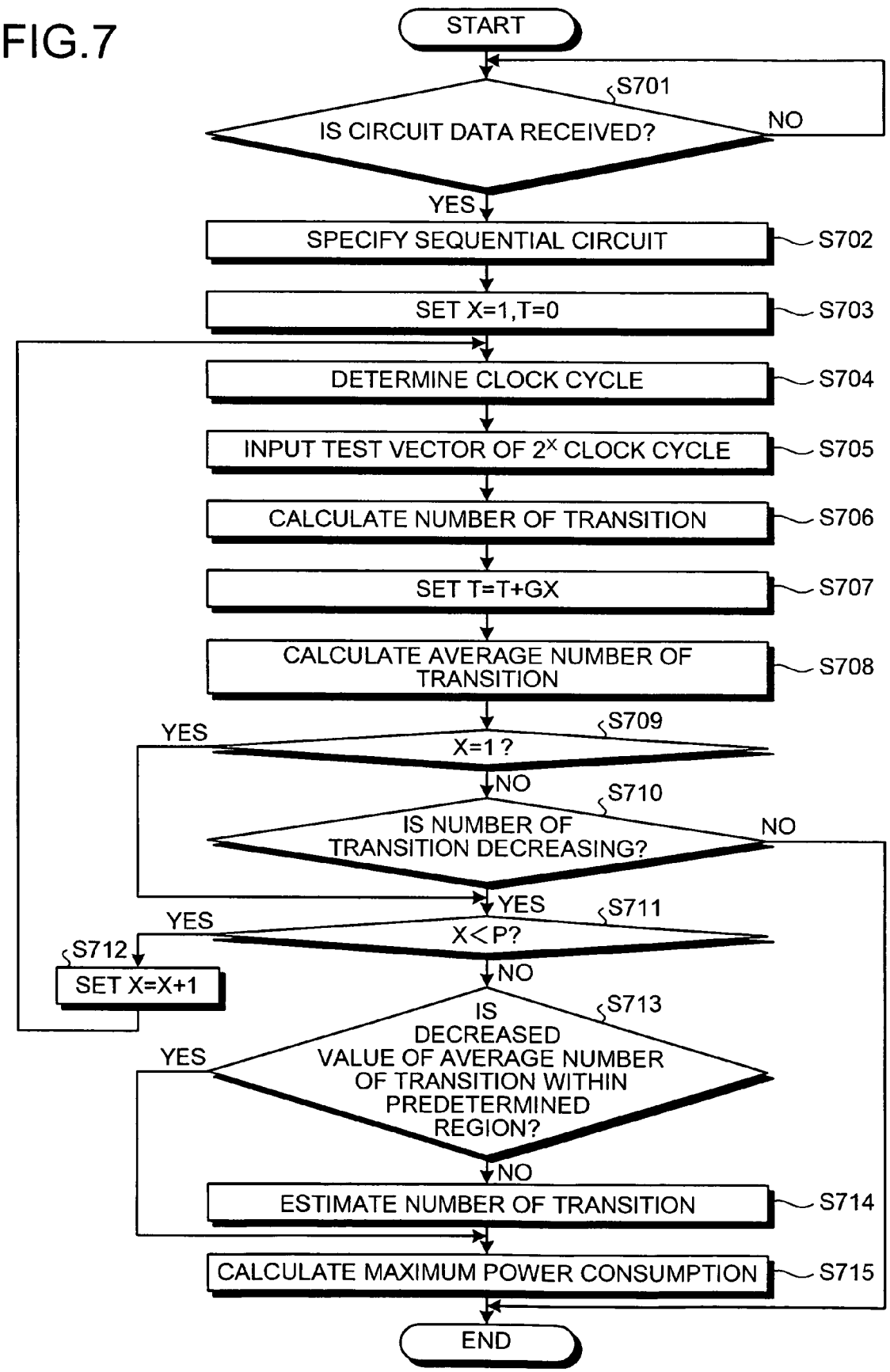
FIG. 7 is a flowchart of a power consumption calculating process performed by the power consumption calculating apparatus.

FIG. 7 is a flowchart of a power consumption calculating process performed by the power consumption calculating apparatus. At first, it is determined whether circuit data is received by the receiving unit 201 (step S701).

When circuit data is received (step S701: YES), the specifying unit 202 specifies a sequential circuit in the target circuit (step S702). Then, X=1, and T=0 are set (step S703). A clock cycle is determined by developing the specified sequential circuit to a combinational circuit by the determining unit 203 (step S704). Then, a test vector of $2^x$-clock cycle is input into the combinational circuit (step S705).

The number of transition GX of $2^x$-clock cycle is calculated (step S706). Then, T=T+GX is set (step S707), where T is the total number of transition of $2^1$-clock cycle to $2^{x-1}$-clock cycle. Then, the average calculating unit 204 calculates the average number of transition (T/$2^x$) (step S708). Then, it is determined whether it is X=1 (step S709). When it is X=1 (step S709: YES), the process proceeds to step S711.

On the other hand, when it is not X=1 (step S709: NO), it is determined whether the average number of transition is decreasing (step S710). When the average number of transition is not decreasing (step S710: NO), a series of processes is finished. On the other hand, when the average number of transition is decreasing (step S710: YES), then, it is determined whether it is X<P (step S711), where P=1 to N indicating the number of transition up to $2^P$-clock cycle. A user can define a value of P.

When it is X<P (step S711: YES), X is incremented (step S712), and the process proceeds to step 704 to generate a test vector of $2^x$-clock cycle. On the other hand, when it is not X<P (step S711: NO), it is determined whether an amount of a decreased value of the average number of transition is within a predetermined region (step S713). When the decreased value is within the predetermined region (step S713: YES), the process proceeds to step S715.

On the other hand, the amount of the decreased value is not within the predetermined region (step S713: NO), the estimating unit 205 calculates the estimated number of transition (step S714). Then, the power consumption calculating unit 206 calculates the maximum power consumption. Thus, a series of processes is finished.

As explained above, according to the embodiments, the number of transition of a target circuit during operation can be precisely calculated at a designing stage. Therefore, it is possible to precisely estimate power consumption of the circuit during the operation.

As explained above, according to the method and the apparatus for calculating power consumption, and the computer product, it is possible to decrease burden on a designer and to shorten a designing period.

The method of calculating power consumption explained in the embodiments can be actualized by executing a program prepared in advance by a computer, such as a personal computer, a work station, etc. The program is stored on a computer-readable recording medium, such as an HD, an FD, a CD-ROM, an MO, a DVD, etc., and is executed by being read from the recording medium by the computer. In addition, the program may be a transmission medium that can be distributed via a network, such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a computer program for calculating power consumption, the computer program making a computer execute:
   receiving data of a target circuit;
   specifying a sequential circuit in the target circuit based on the data;
   developing the sequential circuit to generate a combinational circuit, the developing extracts the combinational circuit in the sequential circuit or generates the combination circuit by combining plural combinational circuits extracted;
   determining a clock cycle of a test pattern to be input into the combinational circuit;
   estimating a number of transitions of a signal that is output from a logic gate in the combinational circuit, while the target circuit is under processing, based on the clock cycle; and
   calculating power consumption of the target circuit based on the number of transitions.

2. The computer-readable recording medium according to claim 1, wherein
   the computer program further makes the computer execute calculating an average number of transitions of the clock cycle based on the test pattern, and
   the estimating includes estimating the number of transitions based on a larger clock cycle than the clock cycle determined at the determining.

3. The computer-readable recording medium according to claim 1, wherein the test pattern includes a test vector.

4. A method of calculating power consumption, comprising:
   receiving data of a target circuit;
   specifying a sequential circuit in the target circuit based on the data;
   developing the sequential circuit to generate a combinational circuit, the developing extracts the combinational circuit in the sequential circuit or generates the combinational circuit by combining plural combinational circuits extracted;
   determining a clock cycle of a test pattern to be input into the combinational circuit;
   estimating a number of transitions of a signal that is output from a logic gate in the combinational circuit, while the target circuit is under processing, based on the clock cycle; and
   calculating power consumption of the target circuit based on the number of transitions.

5. The method according to claim 4, further comprising:
   calculating an average number of transitions of the clock cycle based on the test pattern, wherein
   the estimating includes estimating the number of transitions based on a larger clock cycle than the clock cycle determined at the determining.

6. The method according to claim 4, wherein the test pattern includes a test vector.

7. An apparatus for calculating power consumption, comprising:
   a receiving unit to receive data of a target circuit;
   a specifying unit to specify a sequential circuit in the target circuit based on the data;
   a developing unit to develop the sequential circuit to generate a combinational circuit, the developing unit extracts the combinational circuit in the sequential circuit or generates the combinational circuit by combining plural combinational circuits extracted;
   a determining unit to determine a clock cycle of a test pattern to be input into the combinational circuit;
   an estimating unit to estimate a number of transitions of a signal that is output from a logic gate in the combinational circuit, while the target circuit is under processing, based on the clock cycle; and
   a consumption calculating unit to calculate power consumption of the target circuit based on the number of transitions.

8. The apparatus according to claim 7, further comprising:
   an average calculating unit to calculate an average number of transitions of the clock cycle based on the test pattern, wherein
   the estimating unit estimates the number of transitions based on a larger clock cycle than the clock cycle determined by the determining unit.

9. The apparatus according to claim 7, wherein the test pattern includes a test vector.

* * * * *